United States Patent
Mizuno et al.

(10) Patent No.: US 6,426,850 B1
(45) Date of Patent: Jul. 30, 2002

(54) CONVERTER SUPPORT STRUCTURE

(75) Inventors: Osamu Mizuno; Yutaka Murakami, both of Osaka; Hisayuki Enshu, Kyoto; Tohru Nakamura, Osaka, all of (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/340,783

(22) Filed: Jun. 28, 1999

(30) Foreign Application Priority Data

Jul. 1, 1998 (JP) .......................................... 10-185885

(51) Int. Cl.$^7$ .......................... G11B 21/21; G11B 17/32; G11B 5/60
(52) U.S. Cl. ................................ 360/237.1; 360/236.4; 360/236.6; 369/300
(58) Field of Search .............................. 360/114, 237.1, 360/236.6, 236.4; 369/13, 300, 17

(56) References Cited

U.S. PATENT DOCUMENTS

| | | | | |
|---|---|---|---|---|
| 5,508,869 A | * | 4/1996 | Nanjyo | 360/114 |
| 5,535,075 A | * | 7/1996 | Takahashi et al. | 360/105 |
| 5,600,515 A | * | 2/1997 | Mizuno et al. | 360/104 |
| 5,841,612 A | * | 11/1998 | Nanjyo | 360/114 |
| 5,930,088 A | * | 7/1999 | Yoshida et al. | 360/114 |
| 6,016,239 A | * | 1/2000 | Mizuno et al. | 360/104 |

FOREIGN PATENT DOCUMENTS

| | | | | |
|---|---|---|---|---|
| EP | 0 566 998 | | 10/1993 | |
| JP | 6-76205 | | 3/1994 | |
| JP | 6-84308 | * | 3/1994 | |
| JP | 7-129902 | | 5/1995 | |
| WO | WO 9714140 A1 | * | 4/1997 | G11B/5/48 |

* cited by examiner

Primary Examiner—William Klimowicz
(74) Attorney, Agent, or Firm—Merchant & Gould PC

(57) ABSTRACT

A slider portion is provided with protrusion portions having a spherical surface, contacting a recording medium. A center of a magnetic pole is arranged on the line C1 connecting the vertices of the protrusion portions. Line C1 is more or less aligned with the gliding direction of the protrusion portions. Thereby, positional variations between the magnetic pole and the surface of the recording medium can be minimized even when the head slider is tilted with respect to the surface of the recording medium. Thus, a gliding converter support structure is provided whose conversion efficiency does not decrease when it is tilted with respect to the surface of the recording medium, which is easy to manufacture, has little gliding resistance, and does not easily accumulate dust.

12 Claims, 5 Drawing Sheets

CONVERTER SUPPORT STRUCTURE

BACKGROUND OF THE INVENTION

1. Field of the Invention

The present invention relates mainly to a converter support structure gliding in contact over a recording medium. More specifically, the present invention relates to a gliding converter support structure for a magnetic recording device or an optomagnetic recording and reproducing device used as an external storage device for a computer, or as a recording and reproducing device for music or video signals or other information.

2. Description of the Prior Art

A common example of a conventional gliding converter support structure is a magnetic core support structure for magnetic recording. Magnetic tape and flexible disks used to be the main media using such a structure, but recently minidisks (referred to as "MDs" in the following) are becoming increasingly popular as optomagnetic recording media for recording music. A prerequisite for MDs is the use of a gliding magnetic head slider for optomagnetic overwriting using a modulated magnetic field, and the disk has a gliding film for gliding. The following is a discussion of a magnetic head slider for MDs serving as a converter support structure.

A conventional gliding magnetic head slider for optomagnetic recording, particularly for MDs, is disclosed in Publication of Unexamined Japanese Patent Application No. Hei 6-195851. Its overall structure is shown in FIG. 4(a).

In FIG. 4(a), numeral 101 denotes a slider means serving as a converter support structure, on which a magnetic core 102 serving as a converter, and a coil (not shown in the drawings) are installed. Publication of Unexamined Japanese Patent Application No. Hei 7-129902 discloses details concerning the slider means 101, which are illustrated in FIG. 4(b). A cylindrical surface 101a is formed as a gliding surface on a surface of the slider means that opposes the disk. Numeral 102a denotes the magnetic pole of a magnetic core 102 that is exposed toward the side of the disk.

Publication of Unexamined Japanese Patent Application No. Hei 6-195851 discloses the relation between the cylindrical surface 101a and the magnetic pole 102a, as shown in FIG. 5. FIG. 5 is a drawing of the slider means 101 taken from the opposite side of the surface opposing the disk.

In FIG. 5, A denotes the tangent line to the disk track of the center point of the magnetic pole 102a, and B denotes the disk radius through the magnetic pole 102a.

Contact region 101b is the region of the cylindrical surface 101a contacting the disk's gliding film. The contact line C101 is defined as the line passing along the center of the contact region 101b. The contact line C101 is arranged so that it defines a certain angle $\phi$ with the tangent A through the center of the magnetic core 102a during regular contact with the disk. With such a tilted arrangement, the contact line C101 can be arranged substantially parallel to the tangent direction of the disk track in the contact region 101b, which reduces the gliding width (that is, the width of the contact region 101b in the direction perpendicular to the gliding direction). In FIG. 5, the magnetic pole 102a is shown as if all parts on the side opposing the disk are transparent.

The slider means 101, which includes the cylindrical surface 101a, is made of a resin material that is resistant against abrasion with the disk surface and very smooth, so that it prevents damage due to abrasion between the slider and the disk.

The pressing force of a spring portion 104, which serves as a loading means, causes the contact region 101b of the cylindrical surface 101a to glide in contact with the gliding film of the disk, so that the magnetic pole 102a is positioned near the disk's recording film. The disk may be tilted due to surface warps and distortions, causing positional misalignments but, contact can be maintained because the gimbal 103 is deformed with respect to tilting around an axis orthogonal to the contact line C101 in FIG. 5, and the contact region shifts with respect to tilting around an axis parallel to the contact line C101 (rolling motion). In this situation, thermomagnetic recording is performed by applying to the recording film, which has been heated with focused laser light, a modulation magnetic field with a coil (not shown in the drawings) from the magnetic pole 102a.

Together with the optical head, the slider means 101 can move over the disk in the radial direction B in FIG. 5, so that a recording magnetic field can be applied to any portion of the disk.

However, a conventional magnetic head as described above poses the following problems.

If C102 is the line segment that passes through the center of the magnetic pole 102a in parallel to the contact line C101, then C101 and C102 are separated by the distance d. The value of d varies with shifts of the contact region 101b, but it is preferable that it is zero during regular operation.

The reason for this is that if the disk is tilted around an axis parallel to the contact line C101 for an angle $\theta$, the contact line C101 shifts, and the distance d changes. When the original of d is d0 and the shift portion is d', then the largest possible change of the distance between the magnetic pole 102a and the disk is $(d'+d0)\sin\theta$.

This change of distance causes variations in the size of the magnetic field generated by the magnetic pole 102a, and a field that is too small may lead to recording errors. Therefore, it is necessary to run an additional current through the coil to compensate for the shift portion, which leads to an increase in the consumed power.

Moreover, since the gliding surface 101a is a cylindrical surface, the region of contact with the disk is large, and the viscous resistance with the gliding film of the disk is large, so that the load on the spindle motor increases and causes an increase in the consumed power.

Moreover, the cylindrical surface 101a easily gathers dust, and when dust has accumulated near the center of the contact region 101b for example, it causes a large positional change, changing the distance between the disk and the magnetic pole 102a. Since the contact region is large, the accumulation of dust occurs relatively easily.

As long as the direction in which the slider means 101 moves when accessing the disk in a radial direction is not orthogonal to the contact line C101, it is impossible to consistently match the direction of the contact line C101 with the direction tangential to the track in the contact region. In other words, with this configuration, when accessing the disk in a radial direction, in almost all positions in radial direction of the disk, the contact line C101 has a certain tilt with respect to the direction tangential to the track. This means that the slide width of the contact region 101b (that is, the width in the direction orthogonal to the slide direction of the contact region 101b) is always larger than the width of the contact region 101b in the direction perpendicular to the contact line C101, which becomes a cause for a large sliding resistance and the accumulation of dust.

SUMMARY OF THE INVENTION

It is an object of the invention to solve the above problems of the prior art, and to provide a converter support structure with a simple configuration, high efficiency, and low sliding resistance, that does not easily accumulate dust.

The following describes a configuration of the present invention that achieves these objects.

A converter support structure according to a first configuration of the present invention supports a converter for recording/reproducing while moving relative to a recording medium, and includes at least two protrusion portions for maintaining the converter in a predetermined position with respect to the recording medium by contacting the recording medium. The protrusion portions are arranged substantially in parallel to the direction in which the converter moves relative to the recording medium, and a central portion of a region in which the converter interacts with the recording medium is arranged substantially on a line that passes through centers of regions where the protrusion portions contact the recording medium.

A converter support structure according to a second configuration of the present invention supports a converter for recording/reproducing while moving relative to a recording medium, and includes a protrusion portion for maintaining the converter in a predetermined position with respect to the recording medium by contacting the recording medium. A long axis of a region of contact between the protrusion portion and the recording medium is arranged substantially in parallel to the direction in which the converter moves relative to the recording medium, and a central portion of a region in which the converter interacts with the recording medium is arranged substantially on this long axis.

The converter support structures of the present invention reduce variations in the relative distance between the converter and the recording medium because at least two protrusion portions are arranged substantially in parallel to the direction in which the converter moves relative to the recording medium, and a central portion of the regions in which the converter interacts with the recording medium is arranged substantially on a line that passes through centers of regions where the protrusion portions contact the recording medium, or a long axis of a region of contact between the protrusion portions and the recording medium is arranged substantially in parallel to the direction in which the converter moves relative to the recording medium, and a central portion of a region in which the converter interacts with the recording medium is arranged substantially on this long axis.

In the first configuration, it is preferable that the protrusion portions are two protrusion portions. Moreover, it is preferable that the protrusion portions include a spherical surface. Moreover, in the first and in the second embodiment, it is preferable that the region where the protrusion portion contacts the recording medium is substantially elliptical. With these configurations, the sliding resistance with the recording medium is reduced and the accumulation of dust is reduced, because the region of contact between the protrusion portion and the surface of the recording medium is reduced and the sliding width is reduced. Furthermore, these improved configurations can be manufactured without posing any new difficulties.

DESCRIPTION OF THE PREFERRED EMBODIMENTS

Figure 1:
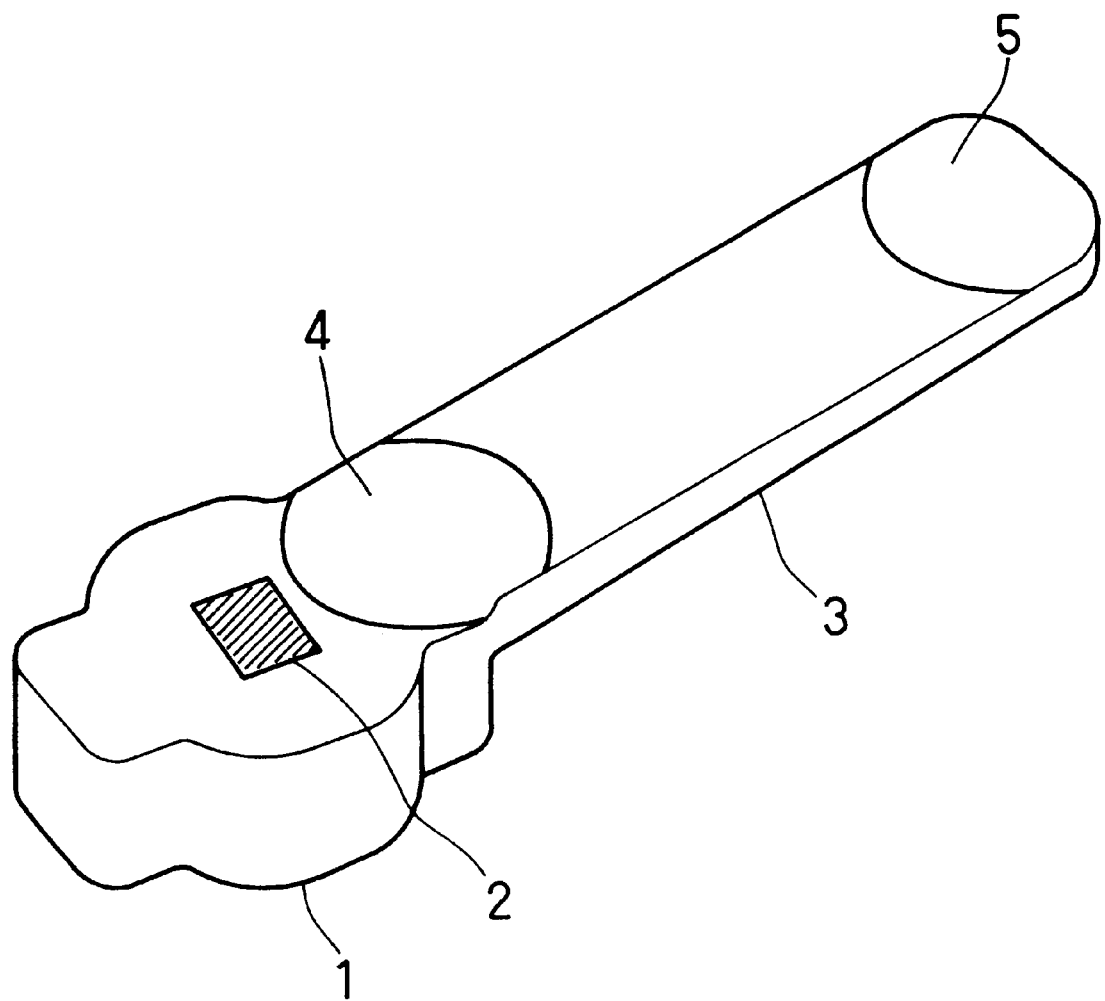
FIG. 1 is a perspective drawing of a magnetic head slider including a converter support structure according to a first embodiment of the present invention.
Figure 2A:
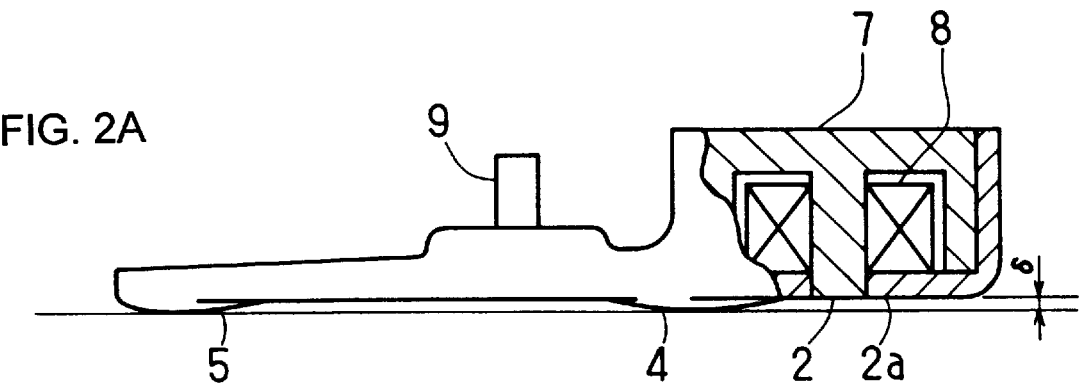
FIG. 2(a) is a side view of the magnetic head slider in FIG. 1.
Figure 2B:
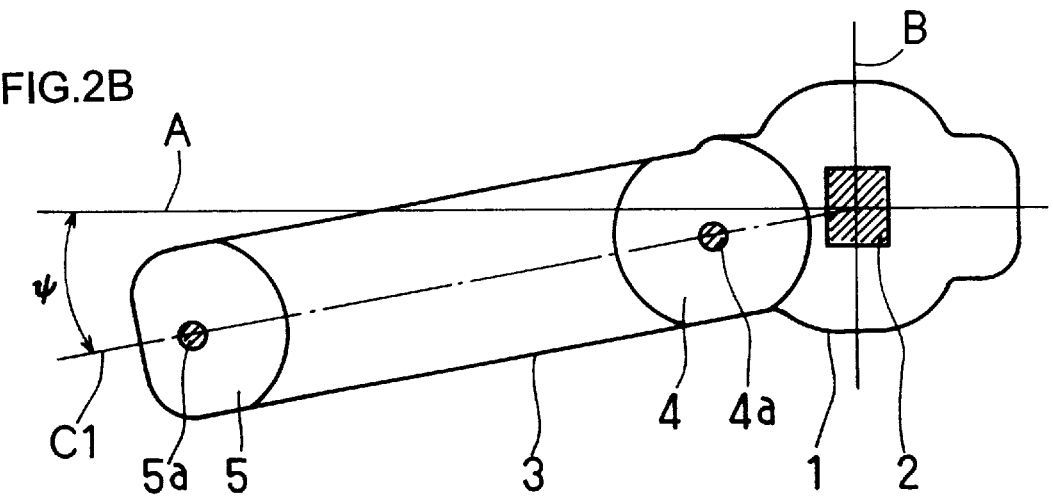
FIG. 2(b) is a bottom view of the magnetic head slider in FIG. 1.
Figure 3:
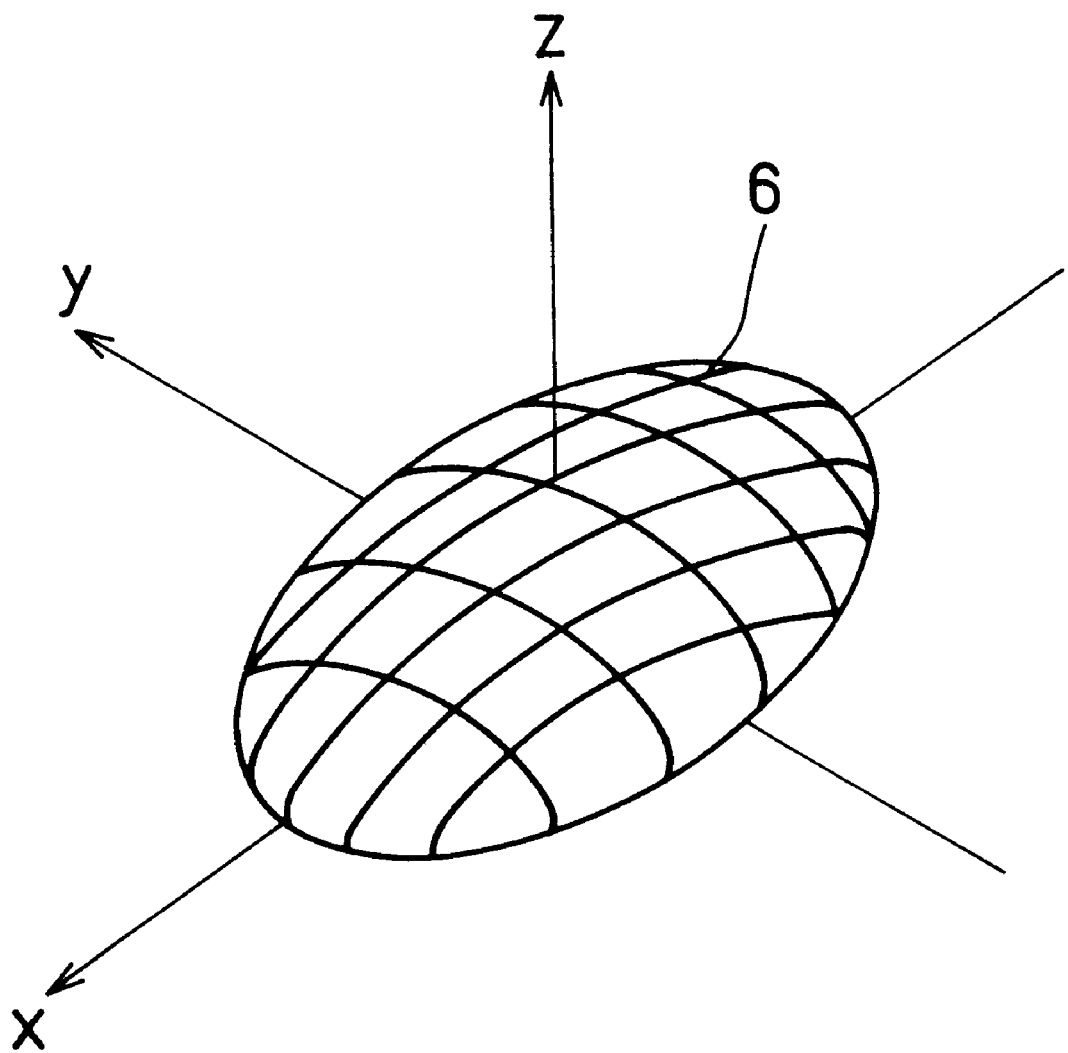
FIG. 3 is a perspective view of the shape of the protrusion portions used in the magnetic head slider including the converter support structure according to a second embodiment of the present invention.

The following is a description of the preferred embodiments of the present invention with reference to FIGS. 1 to 3.

First Embodiment

FIGS. 1 and 2 illustrate a magnetic head slider, that is a converter support structure according to a first embodiment of the present invention. FIG. 1 is a schematic perspective view, FIG. 2(a) is a side view, and FIG. 2(b) is a bottom view.

Numeral 1 denotes a housing portion housing a magnetic core 7 made of a ferrite for example, and a coil 8 made of copper, wherein a magnetic pole 2 is arranged so that it is exposed on the side of the housing that opposes the disk surface. Numeral 3 is a slider portion, and two protruding portions 4 and 5 are arranged on the side of the slider portion 3 that opposes the disk surface. The surfaces of the protruding portions 4 and 5 are spherical. The housing portion 1 and the slider portion 3 are made in one piece of a gliding resin, preferably a liquid crystal polymer to which a fluorine additive has been added.

Figure 4A:
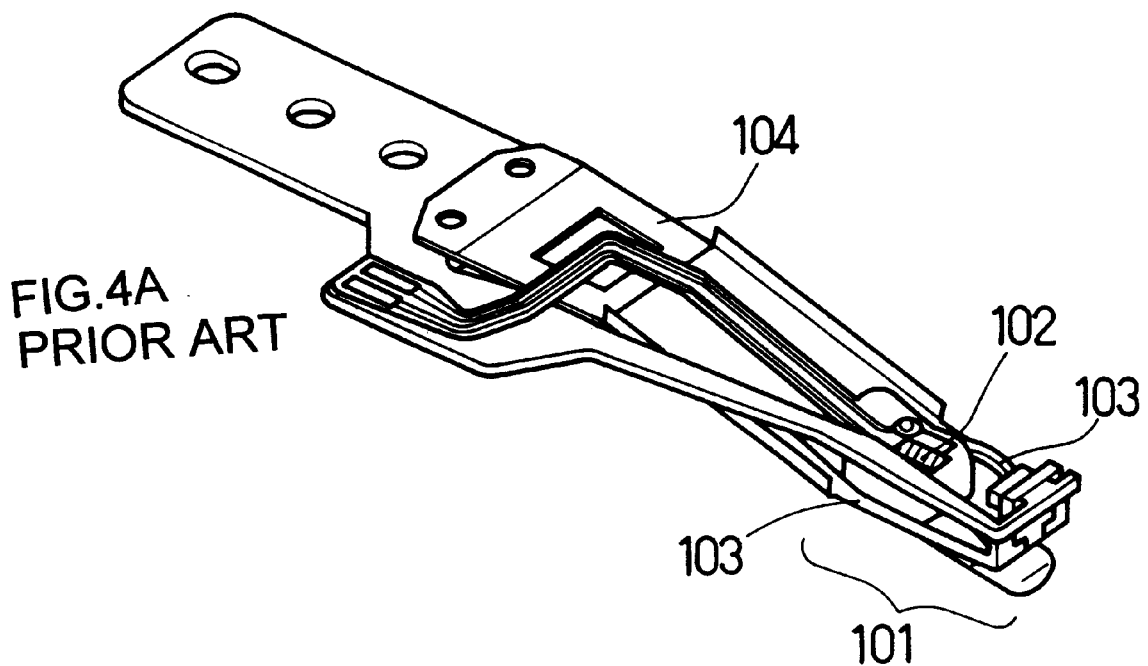
FIG. 4(a) is a perspective view of the entire configuration of a conventional sliding magnetic head.
Figure 4B:
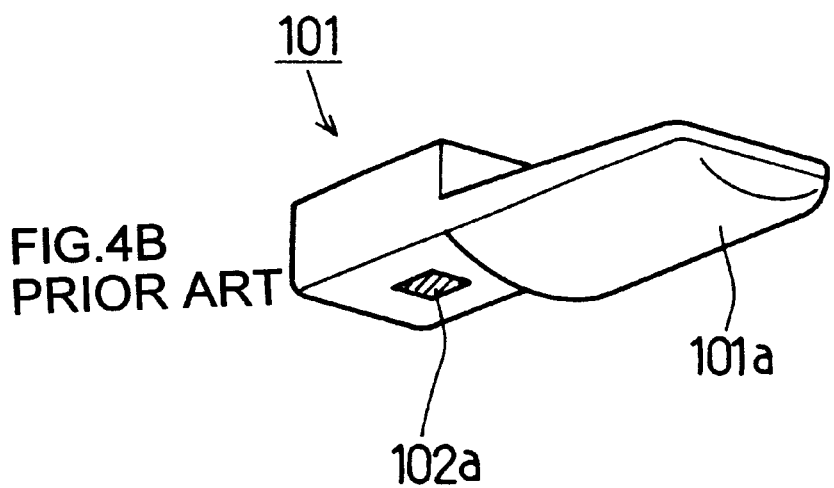
FIG. 4(b) is a perspective view showing the configuration of a slider means used in FIG. 4(a).
Figure 5:
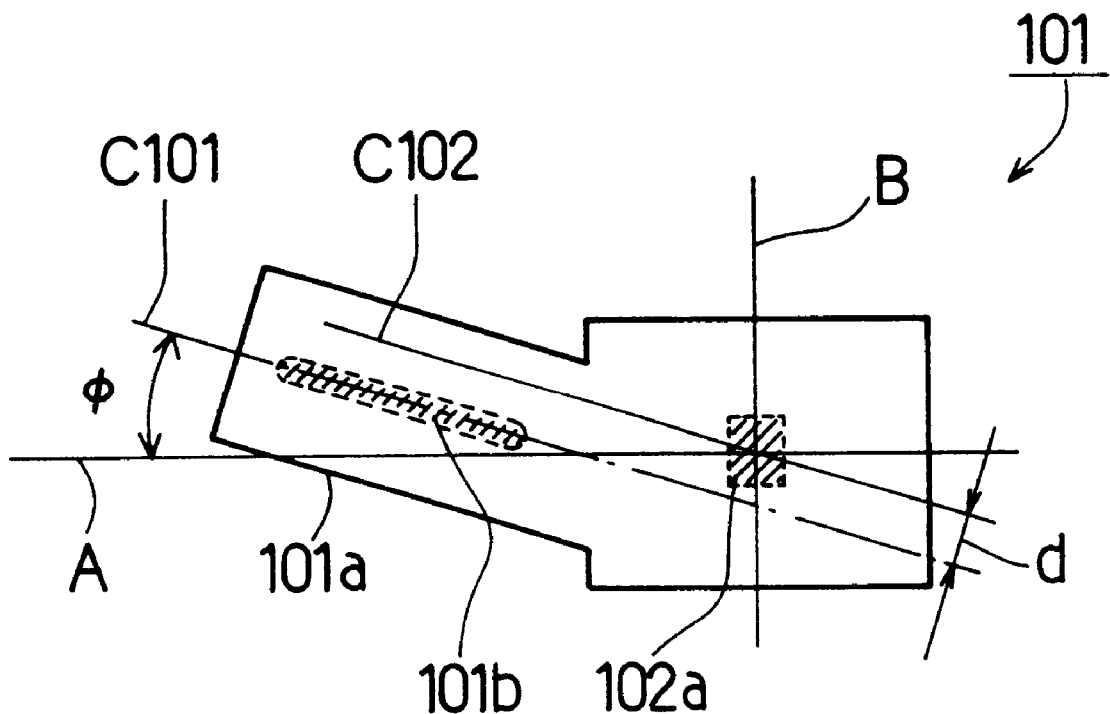
FIG. 5 is a plan view of the configuration of a conventional slider means, taken from the side opposite from the disk.

As can be seen in FIG. 2(a), the protruding portions 4 and 5 protrude a distance δ from the surface 2a that includes the magnetic pole 2. Numeral 9 is a fusion pin 9 for connecting by a known means such as ultrasonic fusion to a structure similar to the gimbal 103 of the conventional example (see FIG. 4). The fusion pin is provided between the protruding portions 4 and 5. Of course, depending on the system for attaching, this fusion pin 9 may be unnecessary, but in any case, the portion that couples to the gimbal 103 (the weight application point for applying a weight that forces the magnetic head slider toward the disk) is provided between the protruding portions 4 and 5.

Numerals 4a and 6a in FIG. 2(b) denote contact regions that result when the protruding portions 4 and 5 glide over the gliding film of the disk, which are basically small circles having the vertices of the spherical protruding portions in their centers. The line C1 through the centers of the contact regions 4a and 5a—that is, the line through these vertices— is the line of contact with the disk during regular operation. The protruding portions 4 and 5 are arranged so that this contact line C1 passes through the center of the magnetic pole 2. A is the tangent line to the disk track in the center point of the magnetic pole 2, and B is the disk radius through the center of the magnetic pole 2.

As in the conventional example, the contact line C1 is arranged so that it defines a certain angle φ ( with the disk tangent A through the center of the magnetic pole 2, and the contact line C1 forms small angles close to zero with the tangents to the disk tracks in the protruding portions 4 and 5.

The following is an explanation of the operation of the first embodiment of the present invention.

The pressing force of a loading means that is similar to the one shown in the prior art example acts at the position of the fusion pin 9 and causes the contact regions 4a and 5a of the protruding portions 4 and 5 to glide in contact with the gliding film of the disk, so that the magnetic pole 2 is positioned near the disk's recording film. The operation against tilts and displacements due to warps and twists in the disk surface is basically the same as in the conventional example, but since the contact line C1 passes through the center of the magnetic pole 2 during regular operation, the distance d0 that was explained for the conventional example becomes 0, which considerably reduces distance variations between the magnetic pole 2 and the disk and particularly enhances the efficiency of the magnetic field per coil current.

Furthermore, because of the two contact points, the contact region is smaller than that of the cylindrical surface 101a of the prior art example, which reduces the viscous resistance and the load of the spindle motor. Also, since contact is established in two points only, the chances of accumulating dust are greatly reduced. Because the contact regions 4a and 5a are substantially circular, even when the contact line C1 does not match any disk track tangent in the protruding portions 4 and 5, there is hardly any variation of the contact width (that is, the width of the contact region in the direction perpendicular to the disk gliding direction), regardless of the value for $\phi$, which allows stable gliding with a small load.

The smaller the curvature radius of the spherical surfaces is, the smaller is the shift of the contact line C1 and thus the distance variations between the magnetic pole 2 and the disk surface when the disk is tilted, but the durability deteriorates. As was ascertained experimentally, from the viewpoint of durability a curvature radius of about R=10 mm is preferable, more preferable is a curvature radius of 10 mm or greater.

The size $\delta$ of the protrusion portion should be as small as possible because this increases the conversion efficiency, but, as has already been pointed out for the prior art example, since the slider portion 3 and the housing portion 1 are linked with a certain obliqueness against the disk, portions other than the regular gliding portions, for example the corner portions of the housing portion 1, may come into contact with the disk, depending on the radius R. Consequently, there is a minimum value for the size $\delta$ of the protrusion portion, which depends on the design. For a curvature radius of about 10 mm, the value of $\delta$ should be about 30 to 60 $\mu$m.

Second Embodiment

FIG. 3 is a perspective view illustrating the shape of the protruding portion of the magnetic head slider in a converter support structure according to a second embodiment of the present invention. The overall configuration of the magnetic head slider in this embodiment is the same as that of the first embodiment shown in FIGS. 1 and 2, so that a detailed explanation has been omitted here. In this embodiment, the spherical protruding portions 4 and 5 serving as the protruding portion of the slider portion 3 are replaced by two protruding portions 6 as shown in FIG. 3, whose long axes (x-axis direction) are aligned with the contact line C1. According to this embodiment, the contact region between the protruding portion 6 and the disk surface is substantially elliptical, and its long axis is aligned with the contact line C1.

The effect of this embodiment is basically the same as that of the first embodiment, but by using the elliptical surface 6 and aligning its long axis with the contact line C1, the contact pressure can be reduced by enlarging the contact area without any danger of enlarging the contact width (that is, the width of the contact region in the direction perpendicular to the disk gliding direction). As a result, the durability of both the slider and the disk is increased, while suppressing the accumulation of dust. As in the first embodiment, it is preferable that the curvature radius of the protruding portion 6 of this embodiment is at least 10 mm with respect to the direction perpendicular to the contact line C1 (y-axis direction), and also the same design values for the protrusion portion amount can be used.

The second embodiment has been explained by way of an example where two protruding portions 6 were formed in the slider portion 3, but it is also possible if there is only one protruding portion 6. This is because it is possible to hold the contact pressure below a certain tolerance value even with only one protruding portion, if, compared to the protruding portions 4 and 5 of the first embodiment, the contact region of one protruding portion becomes comparatively large such as the protruding portion 6 of this embodiment.

The shape of the contact region is not limited to elliptical shapes, but can also be for example rectangular with four arced corner portions or of elongated shape with semicircles at both ends. It is also possible to vary the surface shape of the protruding portion to achieve such a contact region.

The above embodiments have been explained by way of examples where the converter is a magnetic head. However, the converter support structure of the present invention is not limited to this, and the converter can also be an optical head including elements for sending and detecting light signals, or an objective lens. Another possible configuration is to mount a complete optomagnetical recording system including both magnetic head and focusing means.

The invention may be embodied in other specific forms without departing from the spirit or essential characteristics thereof The embodiments disclosed in this application are to be considered in all respects as illustrative and not restrictive, the scope of the invention being indicated by the appended claims rather than by the foregoing description, all changes that come within the meaning and range of equivalency of the claims are intended to be embraced therein.

What is claimed is:

1. A converter support structure for supporting a converter for recording/reproducing while moving relative to a recording medium provided with substantially circular recording tracks, the converter support structure comprising:

at least two protrusion portions for maintaining said converter in a predetermined position with respect to the recording medium by contacting the recording medium:

wherein said protrusion portions are arranged so that each of tangents to the recording tracks at centers of regions where said protrusion portions contact the recording medium is parallel to a line C defined by the centers of the contact regions; and a center of figure of a closed figure, defined when a region in which said converter interacts with the recording medium is projected in a direction normal to a surface of the recording medium, is arranged on the line C.

2. The converter support structure according to claim 1, wherein all of said protrusion portions are formed on one side of said converter in the direction in which said converter moves relative to the recording medium.

3. The converter support structure according to claim 1, wherein said protrusion portions are two protrusion portions.

4. The converter support structure according to claim 1, wherein said protrusion portions comprise a spherical surface.

5. The converter support structure according to claim 1, further comprising, between both ends of the regions where said protrusion portions contact the recording medium in the direction of the relative movement, a weight application point for applying a weight that forces the converter support structure toward the recording medium, thereby contacting said protrusion portions with the recording medium.

6. The converter support structure according to claim 1, wherein said region where said protrusion portion contacts the recording medium is substantially elliptical.

7. The converter support structure according to claim 1, wherein the distance that said protrusion portion protrudes from a surface of said converter is 30 to 60 μm.

8. The converter support structure according to claim 1, wherein a curvature radius of said protrusion portion is at least 10 mm.

9. A converter support structure for supporting a converter for recording/reproducing while moving relative to a recording medium provided with substantially circular recording tracks, comprising:

a protrusion portion for maintaining said converter in a predetermined position with respect to the recording medium by contacting the recording medium;

wherein said protrusion portion is formed in a region that is on one side of said converter in the direction in which said converter moves relative to the recording medium;

said protrusion portion is formed so that a region where said protrusion portion contacts the recording medium has a long axis;

a tangent to the recording track at a center of the contact region is parallel to the long axis direction of the contact region; and a center of figure of a closed figure, defined when the region in which said converter interacts with the recording medium is projected in a direction normal to a surface of the recording medium, is arranged on a line C that is defined by the center of the contact region and is parallel to the long axis thereof.

10. The converter support structure according to claim 9, wherein said region where said protrusion portion contacts the recording medium is substantially elliptical.

11. The converter support structure according to claim 9, wherein the distance that said protrusion portion protrudes from a surface of said converter is 30 to 60μm.

12. The converter support structure according to claim 9, wherein a curvature radius of said protrusion portion is at least 10 mm.

* * * * *